United States Patent [19]

Niederst et al.

[11] 4,015,920
[45] Apr. 5, 1977

[54] DEVICE FOR PRODUCING MOLDED ARTICLES FROM FOAMABLE PLASTICS

[75] Inventors: Jean-Pierre Niederst, Schottmar; Karl Holzinger, Bad Oeynhausen, both of Germany

[73] Assignee: Herbert Kannegiesser Kommanditgesellschaft, Vlotho, Weser, Germany

[22] Filed: June 13, 1975

[21] Appl. No.: 586,768

[30] Foreign Application Priority Data

June 14, 1974 Germany .......................... 2428831

[52] U.S. Cl. .............................. 425/451.9; 249/137; 249/161; 425/817 R
[51] Int. Cl.² .................................................. B29C 1/16
[58] Field of Search ...... 249/120, 137, 139, 219 R, 249/164, 167, 161, 163, 168, 169, 170; 425/4 R, 817 R, 450.1, 451.9, 454, 441, 443, 451, 451.2, 451.3, 451.4, 451.5, 451.6, 451.7, 190, 191, 192, 442, 242 R; 164/341

[56] References Cited

UNITED STATES PATENTS

| 293,710 | 2/1884 | Brush | 249/169 X |
|---|---|---|---|
| 1,541,966 | 6/1925 | Kappele | 425/451.5 X |
| 2,540,199 | 2/1951 | Gorlinski | 249/137 X |
| 3,890,075 | 6/1975 | Bourdo | 425/454 X |

FOREIGN PATENTS OR APPLICATIONS 1,905,621  8/1970  Germany ....................... 425/45.19

Primary Examiner—Richard B. Lazarus
Assistant Examiner—Mark Rosenbaum
Attorney, Agent, or Firm—Sughrue, Rothwell, Mion, Zinn & Macpeak

[57] ABSTRACT

Apparatus for producing molded objects from foamable plastics in which a bipartite mold is secured to two movable clamping plates. One of the clamping plates is movable through at least an angle of 180° from a parallel position with respect to the other clamping plate.

5 Claims, 6 Drawing Figures

DEVICE FOR PRODUCING MOLDED ARTICLES FROM FOAMABLE PLASTICS

BACKGROUND OF THE INVENTION

1. Field of the Invention

The present invention relates to a device for producing molded objects from foamable plastics, more particularly, polyurethane, wherein the two-part mold in which the molded articles are foamed is secured to the superposed clamping plates of a mold support and one of the two clamping plates is movable towards the other clamping plate and returnable to its initial position by means of working cylinders.

2. Description of the Prior Art

In the case of some of the known devices of the above-mentioned construction, the second clamping plate which is not movable by means of the working cylinders is mounted on the frame of the mold support in such a way that is is pivotable from its position with respect to the first plate. The second clamping plate is pivotable both in the case of the device according to German OS No. 1 905 621 and also in the case of another known device by means of normal pneumatically or hydraulically operable working cylinders which are mounted on the frame of the device. As a result, the pivoting range is small and in the case of the device according to German OS No. 1 905 621 is less than 90° and in the case of the other device about 100°. The mold support in the case of these two devices and accordingly, the two-part mold are pivotable about an axis directed at right angles to the mold closing movement and also parallel to the pivot axis of the pivotable clamping plate.

In the case of some of the other devices cited initially it is known to mount the mold support on the frame of the device in such a way that the support and, accordingly the mold which it contains, can be pivoted about two axes disposed at right angles to one another. One of the two afore-mentioned axes is disposed either in the direction of the mold closing direction (German UM No. 7 021 077 and German Utility Model No. 7 219 751) or it is disposed at right angles thereto (German Utility Model No. 022 955).

In the case of another group of the known devices, the mold support is only pivotable about an axis at right angles to the mold closing movement. The axis is either disposed in the center of gravity of the mold support and thus in the region of the clamping plates of the same or it is disposed outside of the clamping plates, for example, to the side of the clamping plates (German OS No. 2 003 308).

It is necessary to pivot the mold support in order to bring the two-part mold disposed in the same into a good pouring and venting position. The pivotability of the mold support is also intended to facilitate operation of these devices — particularly if the second clamping plate is also pivotable — that is, it is intended to facilitate assembly and disassembly of the molds, ready removal of the foamed molded articles from the molds and cleaning of the molds.

The disadvantage of these known devices is that none of them are designed in such a way as to be especially suitable — particularly in terms of their manipulability — for producing a plurality of differently shaped molded articles and for refoaming them or for refoaming so-called inserts or reinforcement parts. In addition, automatic removal of the foamed molded articles from the molds is either impossible or can only be effected in an unsatisfactory manner.

SUMMARY OF THE INVENTION

The object of the present invention is to provide a device of the type mentioned initially which is more advantageous than the abovementioned known devices, particularly in terms of its manipulability, for producing a plurality of differently shaped molded objects, inter alia, long molded articles in the form of push rods for automobiles and and for the refoaming of these molded articles or of so-called inserts or reinforcement parts. The proposed device is also intended to permit particularly advantageous automatic removal of the foamed articles from the mold. It is also designed to be produced at a relatively low cost.

The device according to the invention is characterized in that the second clamping plate which is not movable by means of the working cylinders is mounted on the mold support in such a way that it is pivotable from its position with respect to the first clamping plate about at least 180° about a pivot axis disposed laterally thereof and that the mold support with the two clamping plates is pivotable both about a first axis parallel to the pivot axis of the pivotable clamping plate and about a second axis at right angles to its first axis and disposed laterally with respect to the clamping plates.

By virtue of this configuration of the device, resp., of this combination of partially known features it is possible to produce a plurality of differently shaped molded articles and also long molded articles in the form of push rods for automobiles in an especially efficient manner. The same ampplies to the possible refoaming of these molded articles or to the refoaming of so-called inserts or reinforcements. This configuration of the device is especially advantageous because, after the pivotable clamping plate has been pivoted about at least 180°, both clamping plates are in a position which permits rapid servicing of the device resp., rapid and simple assembly and disassembly of the molds, rapid and simple insertion of inserts or or reinforcements into the molds (during refoaming), rapid and simple removal of the foamed, molded articles from the molds and also rapid and simple cleaning of the molds. It is also advantageous because the mold support with the two clamping plates and the mold parts secured thereto is pivotable about two axes disposed at right angles to one another and thus the molds in which the molded articles are foamed can be brought into a very good pouring and venting position.

If the pivotable clamping plate is only pivoted about 180°, the two clamping plates are then in the same horizontal position which is especially suitable for the automatic removal of the foamed molded articles from the molds.

According to another feature of the device according to the invention, a rotary piston cylinder is the like is provided for pivoting the pivotable clamping plate. As a result, especially rapid and vibration-free pivoting is ensured.

It is also advantageous if the second axis about which the mold support is pivotable is disposed in such a way that the frame in which the mold support is mounted is simultaneously pivotable and if the second axis is identical with the outer edge of the frame. This constitutes an advantage because it means that the production cost of the device is relatively low.

It is also advantageous if the second clamping plate which is pivotable about the pivot axis is rotatably mounted in a U-shaped yoke or the like. It is also advantageous for the pivotable clamping plate to be provided with two parallel clamping surfaces. This constitutes an advantage because it enables two molds or two upper mold parts secured to the pivotable clamping plate, that is, with one attached to each clamping surface, to be used alternately for foaming molded articles. This makes it possible, inter alia, to foam the second molded article when the first foamed, molded article is removed from the mold, resp., from the upper mold part and/or the mold part is being cleaned. This feature of the device according to the invention, that is, the rotatability of the second clamping plate and the provision of two parallel clamping surfaces on the same can also be advantageously used with the above known devices on account of the increased output per unit of time which can be achieved with this feature. Accordingly, protection is also claimed for this application.

Other objects, features and advantages of the present invention will be made apparent in the course of the following detailed description of a preferred embodiment thereof provided with reference to the accompanying drawings.

THE REFERENCE NUMBERS IN THE DRAWINGS DESIGNATE THE FOLLOWING

Figure 1:
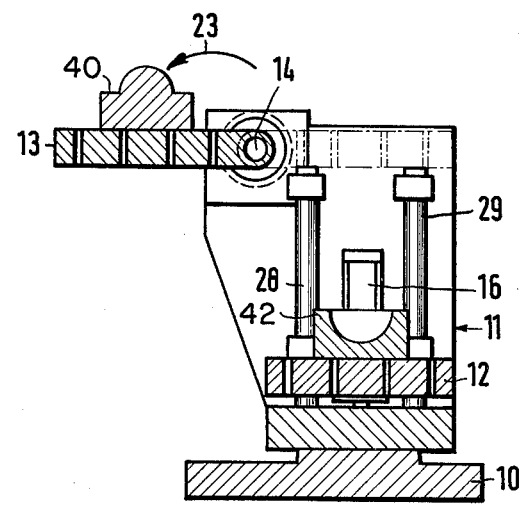
FIG. 1 is a vertical sectional view through the device with the upper clamping plate pivoted about 180°.

10 = frame
11 = mold support
12 = clamping plate (first, lower, movable)
13 = clamping plate (second, upper, pivotable)
14 = pivot axis (for pivoting item 13)
15,16 = working cylinder (for displacing item 12)
17 = working cylinder (for pivoting item 11)
18 = lever
19 = rotary piston cylinder (for pivoting item 13)
20 = working cylinder (for pivoting items 10 and 11)
21 = axis, two part (for pivoting 11)
22 = outer edge or axis (for pivoting 10 and 11)
23 = arrow (pivoting direction of 13)
24 = arrow (pivoting direction of 11)
25 = arrow (pivoting direction of 10 and 11)
26,27 = guide rods (for 12) 28,29
30 = U-shaped yoke
31,32 = clamping surfaces (of 13)
33 = longitudinal axis (of 13)
34 = arrow (direction of rotation of 13)

DESCRIPTION OF THE PREFERRED EMBODIMENT

The device according to FIGS. 1 - 4 consists of the frame 10 in which the mold support 11 is pivotably mounted by means of the two part axis 21. The mold support 11 is pivotable in the direction of the arrow 24 (FIG. 3) and returnable to its initial position by means of the working cylinder 17 which is displaceably mounted on the frame 10. The working cylinder 17 acts on the lever 18 of the mold support 11.

Figure 3:
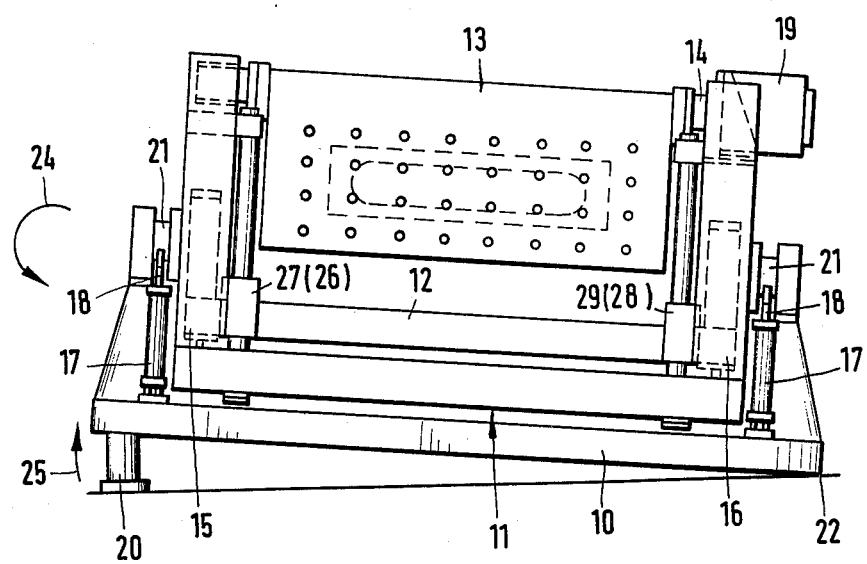
FIG. 3 is a front view of the device according to FIG. 2 pivoted about an outer edge of the frame.
Figure 4:
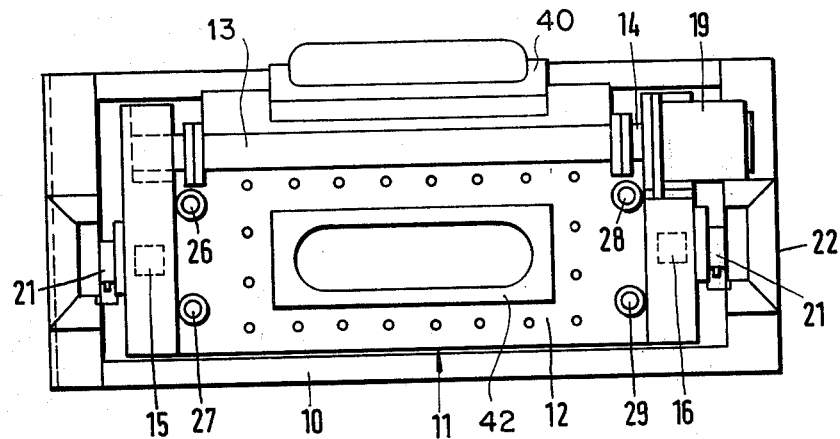
FIG. 4 is a plan view of the device according to FIG. 3.

The frame 10 with the mold support 11 is pivotable about an axis disposed at right angles to the two-part axis 21 and laterally of the clamping plates 12, 13 of the mold support 11. This axis corresponds to the outer edge 22 of the frame 10. The frame 10 with the mold support 11 is pivotable about the outer edge or axis 22 in the direction of the arrow 25 (FIG. 3) and is returnable by means of the working cylinder 20 (FIG. 3).

The lower clamping plate 12 supporting mold halve 42 is adapted to be moved into the position of the upper clamping plate 13 supporting mold halve 40 as represented by the line of dots and dashes (FIGS. 1 and 2) by means of the working cylinders 15, 16 and is returnable to its initial position by means of said cylinders. The clamping plate 12 is guided by means of the guide rods 26 – 29. Accordingly, the guide rods 26 – 29 and the clamping plate 12 have a specific known configuration designed for this purpose.

Figure 2:
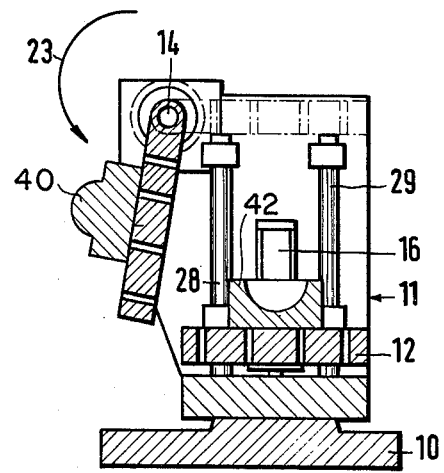
FIG. 2 is a view as shown in FIG. 1, but with the upper clamping plate pivoted about 260°.

The upper clamping plate 13 is adapted to be pivoted out of the position above the lower clamping plate as represented by the line of dots and dashes (FIGS. 1 and 2), in the direction of the arrow 23 and is returnable to its initial position. It is pivotable by means of the rotary piston cylinder 19 about the pivot axis 14 disposed laterally thereto and parallel to the two part axis 21. The pivoting range is at least 180° (FIG. 1) and at maximum about 260° (FIG. 2).

Figure 5:
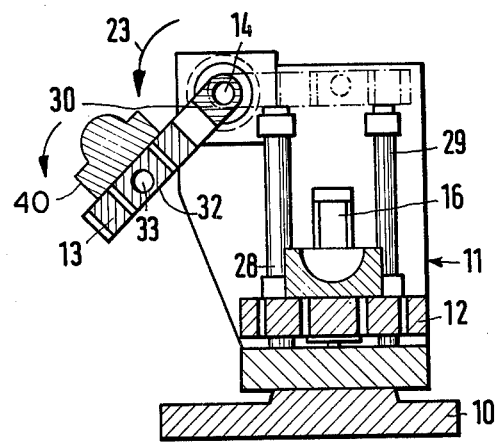
FIG. 5 is a sectional view according to FIG. 2, but with a clamping plate rotatable about its longitudinal axis.
Figure 6:
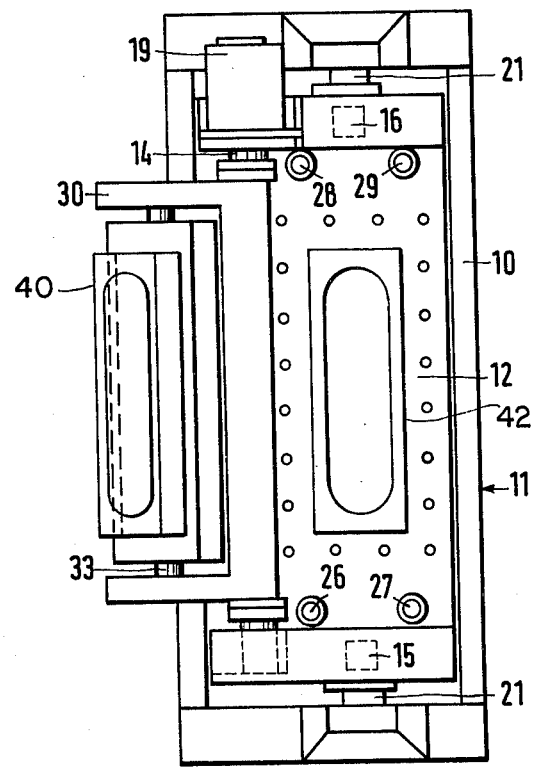
FIG. 6 is a plan view of the device according to FIG. 5.

In the case of the device shown in FIGS. 5 and 6 the second clamping plate 13 which is pivotable about the pivot axis 14 is rotatably mounted in the U-shaped yoke 30. The second clamping plate 13 is thus both pivotable about at least 180° about the pivot axis 14 disposed laterally thereto and is also rotatable about its own longitudinal axis 33. The second clamping plate 13 is rotatable about its longitudinal axis 33 in the direction of the arrow 34 and is returnable by means of elements known per se but not represented.

The second clamping plate 13 represented in FIG. 5 also comprises two parallel clamping surfaces 31,32 for the attachment of molds (not represented).

The devices according to FIGS. 1 – 6 also comprise all the other known elements required for operation of such devices.

What is claimed is:

1. In a device for producing molded articles from foamable plastics, such as polyurethane, wherein a bipartite mold in which the molded articles are foamed is secured to two clamping plates of a mold carrier disposed on top of one another and one of the two clamping plates is movable towards the other clamping plate and returnable to its initial position while maintaining it parallel position to the other clamping plate by means of working cylinders, the improvement comprising: the second clamping plate of said mold carrier which is not movable by means of the working cylinders is mounted to be pivotable out of its position with respect to the first clamping plate about a pivot axis disposed laterally thereto through an angle of at least 180° from a parallel position with respect to the first clamping plate, and the mold carrier with the two clamping plates is pivotable about a first axis parallel to the pivot axis of the second clamping plate and about a second axis disposed at right angles to its first axis and laterally with respect to the two clamping plates.

2. A device as claimed in claim 1, characterized that a rotary piston cylinder is disposed on the mold carrier for pivoting the pivotable clamping plate, said rotary piston positioned on said pivot axis.

3. A device as claimed in claim 1, characterized that said mold carrier is mounted on a frame and the second axis about which the mold carrier is pivotable is disposed in such a way that the frame is simultaneously pivotable with said carrier and that the second axis corresponds to an outer edge of the frame.

4. A device as claimed in claim 1, characterized that the second clamping plate which is pivotable about the pivot axis is not movable by the working cylinders and is rotatably mounted in a U-shaped yoke.

5. A device as claimed in claim 4, characterized in that the pivotable second clamping plate comprises two parallel clamping surfaces.

* * * * *